United States Patent [19]

Hare

[11] 3,872,890

[45] Mar. 25, 1975

[54] SINGLE HANDLE FAUCET VALVE

[75] Inventor: Terence G. Hare, Farmington, Mich.

[73] Assignee: Masco Corporation of Indiana, Taylor, Mich.

[22] Filed: Oct. 25, 1973

[21] Appl. No.: 409,755

[52] U.S. Cl............................ 137/625.41, 251/364
[51] Int. Cl............................................. F16k 11/02
[58] Field of Search ....... 137/625.41; 251/360, 362, 251/363, 364

[56] References Cited
UNITED STATES PATENTS

| | | | |
|---|---|---|---|
| 3,472,279 | 10/1969 | Sanderson | 137/625.41 |
| 3,623,510 | 11/1971 | Hare | 137/625.41 UX |
| 3,747,641 | 7/1973 | Hare et al. | 137/625.41 |
| 3,796,231 | 3/1974 | Hare | 137/625.4 |

Primary Examiner—Robert G. Nilson
Attorney, Agent, or Firm—E. Dennis O'Connor

[57] ABSTRACT

The single handle faucet disclosed herein comprises a faucet body which has a pair of inlets for hot and cold water and a liquid outlet. A spherical valve body is mounted for swinging movement within the body and has a spherical surface that is complementary to a similar compressible spherical surface on the faucet body. The valve body has passages extending from the spherical surface of the valve body. The passages of the valve body and the passages of the faucet body are adapted to be selectively aligned. The compressible spherical surface forms a part of a sealing member which defines a hydraulic seal on the faucet body.

13 Claims, 7 Drawing Figures

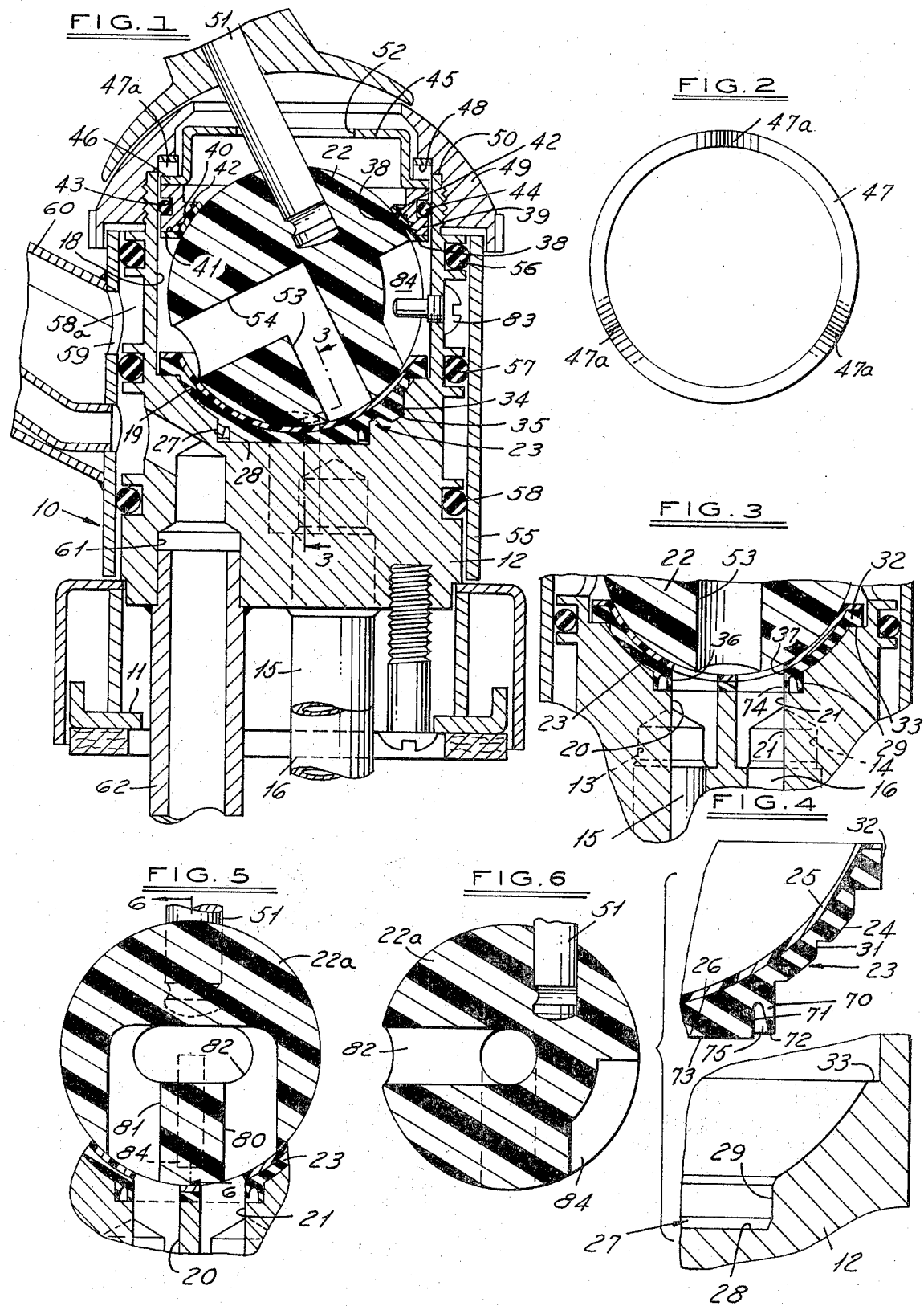

3,872,890

SINGLE HANDLE FAUCET VALVE

This invention relates to water faucets and particularly to single handle faucets.

BACKGROUND OF THE INVENTION

In the faucet art it is common to have what is known as a single handle faucet wherein manipulation of a single handle controls both the degree of mixture of hot and cold water as well as the volume of water which is emitted.

In U.S. Pat. No. 3,506,036, dated Apr. 14, 1970 of Terence G. Hare, there is disclosed and claimed a single handle faucet which comprises a faucet body which has a pair of inlets for hot and cold water and a liquid outlet. A valve body is mounted for swinging movement in a single plane within the faucet body and has a spherical surface that is complementary to a similar compressible spherical surface on the faucet body. The valve body has a valve seat therein and passages extend from the spherical surface of the valve body to the valve seat. A valve stem is mounted within the valve body and supports a bib which is movable toward and away from the valve seat. In one form, seals are provided on the valve and comprise spaced annular sealing members between the valve body and faucet body. In another form, the seals comprise a first annular sealing member and a spherical sealing member interposed between the spherical surface of the valve and the valve body.

Among the objects of this invention are to provide a single handle faucet valve wherein improved sealing is provided between the valve body and faucet body.

SUMMARY

In accordance with the invention, the single handle faucet disclosed herein comprises a faucet body which has a pair of inlets for hot and cold water and a liquid outlet. A valve body is mounted for swinging movement within the faucet body and has a spherical surface that is complementary to a similar compressible spherical surface on the faucet body. The valve body has passages which extend from the spherical surface of the valve body. The passages of the valve body and the passages of the faucet body are adapted to be selectively aligned. Seals are provided on the valve. A spherical compressible sealing surface is provided by a resilient body having a spherical relatively incompressible layer of a low friction material thereon which is dimensionally stable and resistant to hot water. The resilient body has a thickened portion in the area of the inlets of the faucet body which thickened portion extends into a recess of the faucet body. Means are provided on the periphery of the thickened portion of the sealing member which defines a hydraulic seal with the faucet body.

DESCRIPTION OF THE DRAWINGS

FIG. 1 is a fragmentary part sectional view of a faucet embodying the invention.

FIG. 2 is a plan view of a part of the faucet valve shown in FIG. 1.

FIG. 3 is a fragmentary sectional view taken along the line 3—3 in FIG. 1, showing the parts in a different operative position.

FIG. 4 is a fragmentary exploded sectional view showing two parts prior to assembly.

FIG. 5 is a sectional view similar to FIG. 1 showing a modified form of the invention.

FIG. 6 is a fragmentary sectional view taken along the line 6—6 in FIG. 5.

DESCRIPTION

Figure 7:
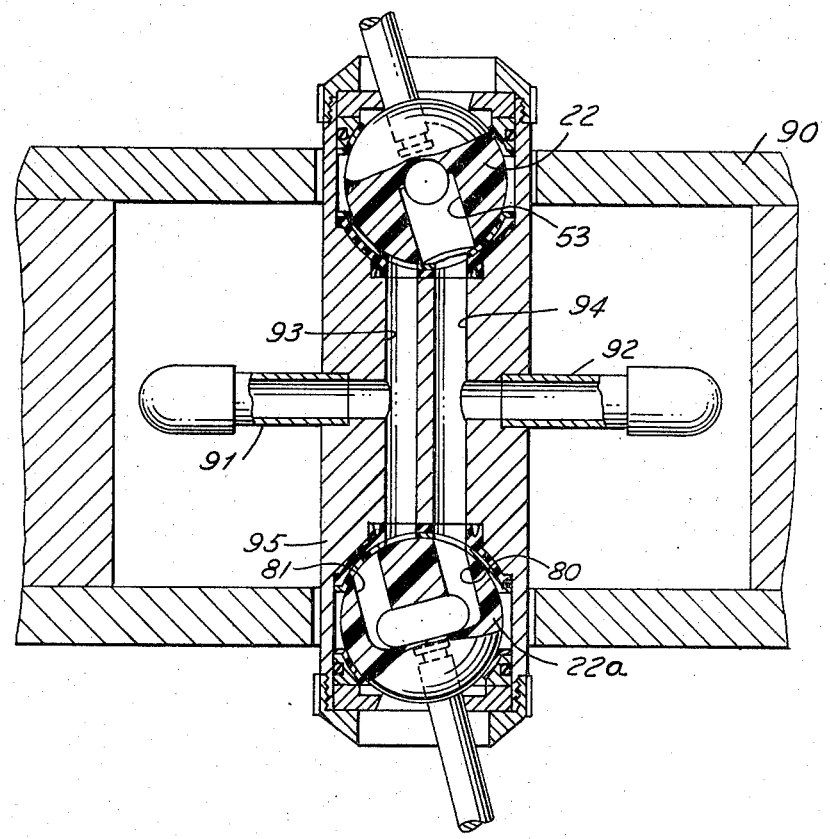
FIG. 7 is a fragmentary horizontal sectional view of a modified form of the invention.

Referring to FIGS. 1 and 3, the faucet 10 is adapted to be mounted on a sink 11 or the like, as presently described. The faucet 10 comprises a faucet body 12 which has spaced vertical inlets 13, 14 in the lower end thereof into which pipes 15, 16 extend. Body 12 is formed with a cylindrical cavity 18 that has an open upper end. The lower wall of the cavity is formed with a generally spherical surface 19. Passages 13, 14 communicate through passageways 20, 21 with the surface 19. A spherical valve body 22 which has a spherical lower end extends into the cavity 18 with the spherical surface thereof engaging a spherical seating surface on a sealing member 23.

Sealing member 23 comprises a body 24 of rubber or other similar resilient material and a layer 25 of relatively incompressible dimensionally stable low friction material bonded to the upper surface thereof. A satisfactory material comprises Teflon. Sealing member 23, and particularly the rubber body 24 thereof, includes a central thickened portion 26 which is generally circular and extends into a generally complementary recess 27, the bottom surface 73 of the thickened portion and the bottom surface 28 of the recess being generally flat. The portion of the rubber body 24 surrounding the thickened portion 26 is formed with annular serrations 31 surrounding the portion 26 in order that the body may have better resilient sealing contact with the spherical portion of the surface 19.

The thickened portion 26 of sealing member 23 has an outer diameter less than the diameter of the periphery 29 of the recess 27. The sealing member 23 is formed with a thin tapering peripheral flange or web 70 that extends along and parallel to the periphery 71 of the thickened portion 26 and terminates in a feather edge 72 spaced slightly above the bottom 73 of the thickened portion 26. The thickened portion is formed with a radial passage 74 (FIG. 3) comprising a groove which permits water from one passageway 21 to pass to the annular space 75 between the periphery 71 and the web 70. This causes a hydraulic pressure forcing the web 70 against the surface 29 providing a hydraulic seal that in turn prevents leakage of water past the sealing member 23.

The sealing member 23 also includes a peripheral lip 32 that engages a complementary shoulder 33 on the faucet body 12. Finally, the rubber body 24 of the sealing member 23 includes a small axial projection 34, radially outwardly beyond thickened portion 26 that extends into a complementary opening 35 to circumferentially locate the sealing member and thereby align openings 36, 37 therein with the upper ends of the passageways 20, 21.

An annular seal 38 which has a generally obtuse angle cross section in the untensioned state is provided adjacent the upper end of the spherical portion 22 and is urged into sealing contact therewith by a collar 39 that extends into the cylindrical cavity 18 and has surfaces 40, 41 that extend upwardly and inwardly and horizontally, respectively, to engage the surfaces of the seal 38 and urge the inclined surface against the surface of the spherical member 22. The surface 40 of collar 39 which engages the seal 38 has annular ribs 42 thereon which firmly grip the seal 38 and urge it against the spherical surface of the valve body 22. The collar 39 is formed with an annular groove 43 in which an O-ring 44 is seated to provide a seal between the seal collar 39 and the wall of the cavity 17.

A guide ring 45 extends within the cavity 18 over the seal collar 39. Guide ring 45 includes a peripheral flange 46 that engages the upper end of the seal collar 39. A flat sinuous annular spring 47 is interposed between a shoulder 48 on faucet nut 49 and flange 46. Faucet nut 49 is threaded on the upper end of the valve body 12 and holds the guide ring 45 and, in turn, the collar 39 in position to, in turn, cause the seal 38 to engage the surface of the spherical portion of the valve body 22 and urge it toward surface 25. When the faucet nut 49 is rotated, a shoulder 50 thereon engages the upper end of the faucet body 12 limiting the axial movement of the nut 49 onto the body 12 and as a result the pressure with which the seal ring 39 is held against the valve body 22 is controlled.

Spring member 47 has an uneven number of undulations 47a herein shown as three. It has been found that the use of an odd number of undulations cooperates with the sealing member 23 to permit the spherical valve body 22 to accommodate for shrinkage and other molding variations in the valve body 22. In other words, the odd number of undulations permits a lateral movement of the valve body 22, to properly seat on the sealing member and provide the desired seal particularly when the valve body is rotated to the closed or non-flowing position for water.

The valve ball 22 includes a generally cylindrical rod 51 which is D-shaped in cross section. The lower end of rod 51 is embedded in valve body 22 and the rod 51 extends upwardly through a generally triangular opening 52 in the guide ring 45.

The seal 38 is preferably made of a low friction material which is resistant to hot water and is dimensionally stable. A satisfactory material comprises Teflon. The valve body 22 is also preferably made of a low friction dimensionally stable material that is resistant to hot water and is different from material of seals 38, 23. A satisfactory material comprises a phenyline oxide type such as made by General Electric Company, Pittsfield, Massachusetts, and sold under the trademark, NORYL.

Spherical valve body 22 includes a single passage 53 which extends radially inwardly from the surface 22. The passage 53 communicates with a diametral passage 54 that extends from the upper end of the passage 53 radially outwardly to the periphery of the valve body 22 at a right angle to the axis of the passage 53. The construction is such that the valve body 22 can be molded in a single integral piece. The arrangement is such that the valve body 22 is substantially symmetrical so that differential shrinkage is minimized in a single piece.

A cylindrical sheet metal sleeve 55 is rotatably mounted and surrounds the body 12 with O-rings 56-58, in annular recesses in the body engaging the interior of the sleeve to provide a seal. Water can flow outwardly into a space 58a between the valve body 12 and the sleeve 55 and through an opening 59 in sleeve 55 to the spout 60 on sleeve 55.

By swinging the knob and, in turn, the valve body 22, the degree of registry of opening with respect to passages 20, 21 may be controlled; the extent of registry determining the relative amounts of hot and cold water which are delivered to the passage.

In the form of the invention shown in FIGS. 5 and 6, the valve body 22a has a modified configuration of passageways including spaced passages 80, 81 that extend parallel to a radius and communicate with a single outlet passage 82 extending radially outwardly. Passages 80, 81 are selectively aligned with inlet passageways 20, 21.

A screw 83 extends into a groove 84 and the valve body 22 to insure proper assembly of the valve body in the faucet valve.

By providing a stop against which the nut 49 is tightened, together with the spring 47 interposed between the nut 49 and the seal 38, a uniform sealing pressure is provided each and every time that the faucet is assembled or disassembled and overtightening with resultant damage to the parts is eliminated.

The provision of a single passage 53 in the valve body 22 results in a construction wherein the passage is at all times in overlying relationship to the thickened portion 26 of the sealing member 23. As a result, there is no variation in sealing pressure as the valve body 22 is manipulated with respect to the faucet body 12. This insures the same sealing pressure under all water conditions and assists in proper maintenance of the seals since there is no fluctuation or change in the sealing pressure as the valve body is manipulated.

As heretofore stated, by providing a substantially symmetrical valve body 22, the manufacture of the valve body 22 is facilitated and in addition the valve body 22 has a longer life since it is substantially symmetrical and therefore there are no unbalanced forces in use.

Spring 47 also acts as a resilient member allowing body 22 to move slightly in any direction to conform to any shrinkage imperfections in the molding of the body 22 thus providing better sealing and ease of operation.

Referring to FIG. 7, there is shown therein the manner in which the forms of the invention shown in FIGS. 1 and 5 may be combined in a wall to provide a simple connection without the need for twisting the hot and cold water inlets to maintain them in proper alignment with respect to the user. As shown in FIG. 7, a vertical wall 90 has the type of faucet shown in FIGS. 1 and 5 in one surface thereof and the types shown in FIGS. 5 and 6 in the other surface thereof. The inlets from the two pipes 91, 92 pass to channels 93, 94 in a body 95 extending between the wall surfaces and on which the faucets are mounted, the body 95 taking the place of the faucet body 12 and serving to mount both faucets. Thus the passages 93, 94 representing the hot and cold passages pass on the one hand to the single passage 53 of the valve body 22 of the one faucet and to the dual passages 80, 81 of the valve body 22a of the other faucet properly providing for a mixing that will not necessitate any twisting at the passages 93, 94 as would be the case if identical faucet bodies were used in the two wall surfaces. It can be seen that this may be a substantial saving in an arrangement wherein faucets are mounted back to back in a wall as for example in modular housing or arrangements wherein a bathroom is adjacent one wall surface and a kitchen or other facility is adjacent the other wall surface.

I claim:

1. In a single handle faucet, the combination comprising a faucet body, said faucet body having a pair of liquid inlets for hot and cold water and a liquid outlet, said faucet body having a generally spherical surface, a sealing member having a generally spherical surface mounted on said spherical surface of said faucet body surface and having a centrally located axially thickened portion, said faucet body having a generally complementary recess into which said thickened portion of said sealing member extends, the periphery of said thickened portion being spaced from the periphery of said recess, means integral with said sealing member but spaced from said thickened portion providing a hydraulic seal between said sealing member and said recess, said means comprising a peripheral web surrounding said thickened portion, said faucet body having passages extending from said inlets to said recess in said faucet body, said sealing member having openings through said thickened portion aligned with the passages in said faucet body, a valve body mounted for swinging movement within said faucet body, said valve body having a spherical surface complementary to said spherical surface on said sealing member, said valve body having passage means extending from one area on the periphery of said spherical surface of said valve body to another area of the periphery thereof to said valve seat, one end of said passage means terminating along said spherical surface such that said passage means is adjacent said thickened portion of said sealing member in all positions of said valve body, and means for guiding said valve body to selectively change the communication of the passage means in the valve body with the inlets of said faucet body.

2. The combination set forth in claim 1 wherein said web extends axially and has a free edge.

3. The combination set forth in claim 2 wherein said web tapers toward said free edge to a thin edge.

4. The combination set forth in claim 1 including a passage in said sealing member extending from said passage means to the space surrounding said thickened portion.

5. The combination set forth in claim 4 including a plurality of annular serrations adjacent said thickened portion formed in said sealing member.

6. The combination set forth in claim 1 including a second sealing member on another portion of said valve body, a locking member mounted on said faucet body, and a spring interposed between said locking member and said second sealing member, means limiting the movement of said locking member on said faucet body whereby there is a predetermined spring pressure of said second sealing member on said valve body urging said valve body against said first sealing member such that the valve body is urged into a predetermined pressure against said first sealing member.

7. The combination set forth in claim 6 including a guide member interposed between said second sealing member and said spring.

8. The combination set forth in claim 6 wherein said spring comprises a sinuous spring having spaced substantially flat surfaces engaging said second sealing member at circumferentially spaced points.

9. The combination set forth in claim 6 wherein said locking member comprises a member threaded on said faucet body and interengaging surfaces between said member and said faucet body limiting the extent of axial movement of said member onto said faucet body.

10. The combination set forth in claim 1 wherein said valve body includes a single passage overlying said spaced passages in said thickened portion of said sealing member.

11. The combination set forth in claim 1 wherein said valve body includes a pair of passages extending generally parallel to a radius and communicating with a single passage intersecting said pair of passages.

12. The combination set forth in claim 11 including a plurality of annular serrations said thickened portion formed in said sealing member.

13. The combination set forth in claim 11 including a layer of relatively incompressible dimensionally stable low friction plastic material on said sealing member, said sealing member having an axial projection thereon, said faucet body having an opening into which said projection extends.

* * * * *